(12) United States Patent
Grziwok et al.

(10) Patent No.: US 9,416,915 B2
(45) Date of Patent: Aug. 16, 2016

(54) CONFIGURABLE MOUNTING SYSTEM

(71) Applicant: Lilitab LLC, San Rafael, CA (US)

(72) Inventors: Bryan Rudolf Grziwok, Berkeley, CA (US); Adam Scott Aronson, San Rafael, CA (US)

(73) Assignee: Lilitab LLC, San Rafael, CA (US)

( * ) Notice: Subject to any disclaimer, the term of this patent is extended or adjusted under 35 U.S.C. 154(b) by 0 days.

(21) Appl. No.: 14/211,591

(22) Filed: Mar. 14, 2014

(65) Prior Publication Data

US 2014/0265764 A1 Sep. 18, 2014

Related U.S. Application Data

(60) Provisional application No. 61/800,221, filed on Mar. 15, 2013.

(51) Int. Cl.
| | | |
|---|---|---|
| *F16M 13/00* | (2006.01) | |
| *F16M 11/14* | (2006.01) | |
| *F16M 13/02* | (2006.01) | |
| *G06F 1/16* | (2006.01) | |

(52) U.S. Cl.
CPC .............. *F16M 11/14* (2013.01); *F16M 13/02* (2013.01); *G06F 1/1626* (2013.01); *G06F 1/1656* (2013.01); *F16M 2200/065* (2013.01)

(58) Field of Classification Search
CPC . F16M 11/14; F16M 13/02; F16M 2200/065; G06F 1/1656; G06F 1/1626
USPC ......................................................... 248/553
See application file for complete search history.

(56) References Cited

U.S. PATENT DOCUMENTS

| | | | |
|---|---|---|---|
| 6,379,073 B1 | 4/2002 | Yoo | |
| 7,218,510 B2 | 5/2007 | Hillman | |
| 7,316,377 B2 | 1/2008 | Smed | |
| 7,694,922 B2 | 4/2010 | Kim | |
| 2012/0061542 A1 | 3/2012 | Bostater | |
| 2012/0314354 A1* | 12/2012 | Rayner | G06F 1/1656 361/679.01 |
| 2013/0026322 A1* | 1/2013 | Wheeler et al. | 248/289.31 |
| 2013/0220841 A1* | 8/2013 | Yang | A45C 11/00 206/37 |
| 2014/0360893 A1* | 12/2014 | Whitten | A45C 11/00 206/45.2 |
| 2015/0301560 A1* | 10/2015 | Garland, Sr. | G03B 17/568 455/575.8 |

OTHER PUBLICATIONS http://armodilo.com/products/armotwist, Armodilo ArmoTwist, 2013, downloaded Sep. 25, 2013, 3 pages.
http://www.ipadenclosures.com/ipad_kiosk_enclosure/ipad_table_mounts_stands/axis-ipad-table-mount, iPad Enclosures LLC, Axis iPad Mount, 2013, downloaded Sep. 25, 2013, 4 pages.

* cited by examiner

*Primary Examiner* — Mark Wendell
(74) *Attorney, Agent, or Firm* — Fish & Richardson P.C.

(57) ABSTRACT

One example of a configurable mounting system includes can be implemented as a system for mounting electronic equipment. The system includes an enclosure housing to mount the electronic equipment. Multiple ribs are formed within the enclosure housing. A stiffener plate is received by the multiple ribs to mount the stiffener plate within the enclosure housing.

20 Claims, 4 Drawing Sheets

CONFIGURABLE MOUNTING SYSTEM

CROSS REFERENCE TO RELATED APPLICATIONS

This disclosure claims the benefit of the priority of U.S. Provisional Application Ser. No. 61/800,221, filed Mar. 15, 2013, and entitled "Configurable Mounting System", which is incorporated herein by reference in its entirety.

TECHNICAL FIELD

This disclosure relates to a system of removable and interchangeable components for mounting an enclosure for electronic devices to a support structure.

BACKGROUND

An electronic device, such as a computer, control panel, or tablet computer, can be presented for public use. To do so, the device can be housed in an enclosure and mounted on a support. This enclosure can have several attributes useful when deployed in a public, unsupervised location. These attributes include physical robustness (to resist damage), tamper and theft-resistance, resistance to ingress of water and/or contaminants, etc. An enclosure which possesses such attributes can be called a "secure enclosure". A secure enclosure which is deployed in a public location can be called a "kiosk".

Such equipment, when deployed by users in public places and places of business, can offer different mounting and articulation features. An example feature can be that the secure enclosure is rigidly mounted to the support structure. An alternative or additional feature can be that the display tilts up and down so that users of different heights can view the display comfortably. Another alternative, or additional feature can be that the entire head is removable, for example, to facilitate handheld use.

In addition to offering various articulation and removability features, the enclosure can be coupled to the support structure. Undue flexibility in the joint between the enclosure and support structure may create a perception that the mount is weak or insecure.

SUMMARY

This disclosure relates to a system of removable and interchangeable components for the purpose of mounting an enclosure for electronic devices to a support structure.

The interchangeability of the components allows the mounting system to be configured to provide various useful modes of articulation and removability, as may be desired by the end user and required by the specific application for which the system is deployed.

This disclosure further describes a stiffener plate and network of stiffening ribs which, acting together, reduce the size of the mounting pattern required to achieve acceptable stiffness in the joint between the support structure and the secure enclosure.

This disclosure further describes a series of joints and mounting components which may be used in conjunction with the stiffener plate, and which use the same mounting interface. The interchangeability of the hardware which can be mounted to the head is advantageous as it allows the enclosure system to be differently configured for different deployment scenarios.

Details of one or more implementations of the subject matter described in this specification are set forth in the accompanying drawings and the description below. Other features, aspects, and potential advantages will become apparent from the description, the drawings, and the claims.

DETAILED DESCRIPTION

This disclosure relates to a mounting system designed for use with electronic devices (in general) and tablet computers (specifically). The enclosure can be a secure enclosure, i.e., an enclosure which is designed so as to prevent access by unauthorized persons, thus providing for the security of the contents within. Such contents may include a tablet computer or other electronic equipment. Aspects of a secure enclosure include physical robustness and toughness to resist abuse and having no accessible fasteners or method of opening the enclosure without damaging it. The secure enclosure can be a kiosk in the specific context of an environment where it is used and interacted with by members of the public.

The system includes a stiffener plate which is mounted internal to the enclosure, and a network of stiffening ribs which, acting together with the stiffener plate, can reduce the size of the mounting pattern required to achieve acceptable stiffness in the joint between a support structure and the secure enclosure. The support structure can be the portion of the apparatus which is attached to a fixed surface (for example a table, counter, wall, or heavy baseplate) and which provides support for the enclosure. The interchangeability of the components allows the mounting system to be configured to provide various useful modes of articulation and removability, as may be desired by the end user and required by the specific application for which the system is deployed.

This disclosure further describes a series of joints and mounting components which may be used in conjunction with the stiffener plate, and which use the same mounting interface. The stiffener plate provides standardized mounting points for attaching a variety of support hardware. The specific geometry at the interface between the rear housing, stiffener plate, and mounted support structure provides substantial rigidity of the overall joint, in a small amount of space. The interchangeability of the hardware which can be mounted to the head is advantageous as it allows the enclosure system to be differently configured for different deployment scenarios.

Figure 1:
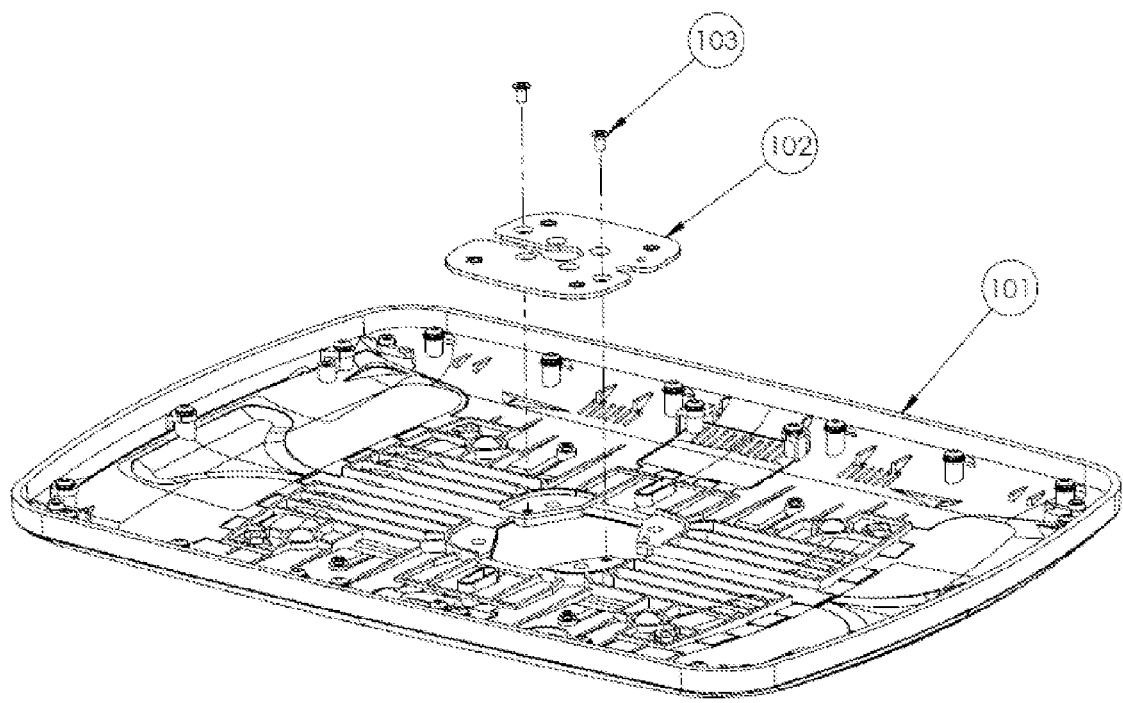
FIG. 1 illustrates the installation of the stiffener plate into the housing.

FIG. 1 illustrates the installation of the stiffener plate 102 in the enclosure housing 101. In some implementations, screws 103 hold the stiffener plate 102 in place. The stiffener plate 102 can be made of steel. Other sufficiently rigid materials, such as glass-filled nylon, fiberglass laminate, magnesium, or aluminum alloy may alternatively be used. In some implementations, mounting screws (203 or 403) can installed in conjunction with the screws 103, for example, from the other direction, to provide additional mounting strength to the stiffener plate 102. As shown in FIG. 1, a pocket to receive the stiffener plate 102 can be formed by a network of ribs internal to the enclosure housing 101. The pocket further can be surrounded by an extended network of radial ribs. As described below, the pocket can be configured to receive the stiffener plate 102 on the inside of the enclosure housing, and different supports (for example, a rigid support, a pivotable support, or other suitable supports) mounting to the stiffener plate 102 from outside the enclosure. In some embodiments, the attachment of the external support can pass through the thickness of the enclosure housing 101 and fasten into the stiffener plate 102. When the supports are affixed to the stiffener plate 102 in the pocket, the combination of the stiffener plate 102 and the network of ribs disposed around the slot can work in cooperation to rigidly secure the support to the enclosure housing 101.

Figure 2:
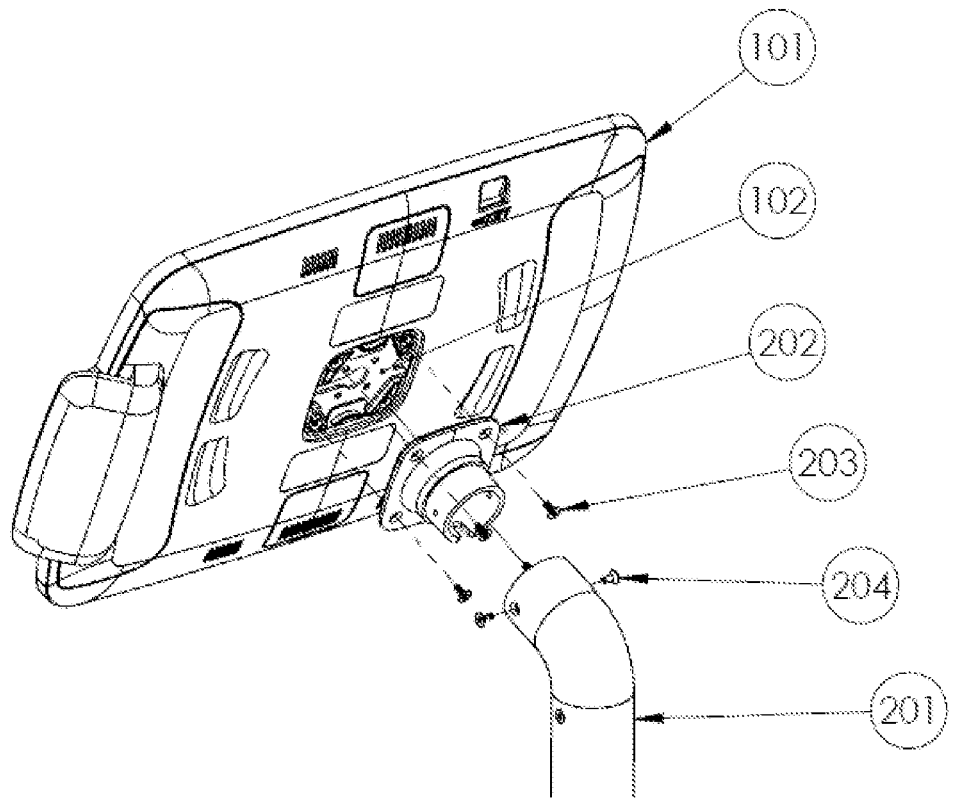
FIG. 2 shows the mounting system implemented with a rigid mount.

FIG. 2 illustrates a configuration of the mounting system deployed in conjunction with a rigid support 202. In this configuration, the rigid support 202 is mounted to the stiffener plate 102 with four security screws 203. The rigid support 202 is secured to the support structure 201 with two additional security screws 204. Alternative means of attachment may be used instead of security screws 204, such as rivets or direct welding.

Figure 3:
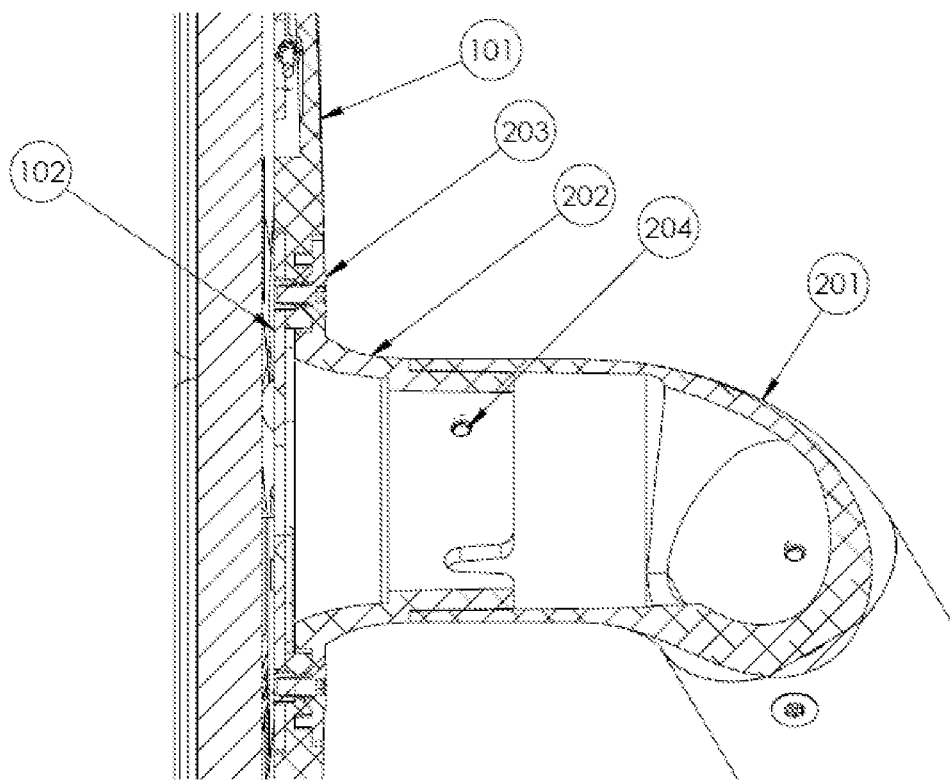
FIG. 3 shows a cross-section of the system implemented with a rigid mount.

FIG. 3 illustrates a diagonal cross-section through the configuration illustrated in FIG. 2. Security screws 203 pass through the Rigid support 202 and engage with threaded inserts in stiffener plate 102, sandwiching the enclosure housing 101. The rigid support 202 is secured to the support structure 201 with additional security screws 204.

Figure 4:
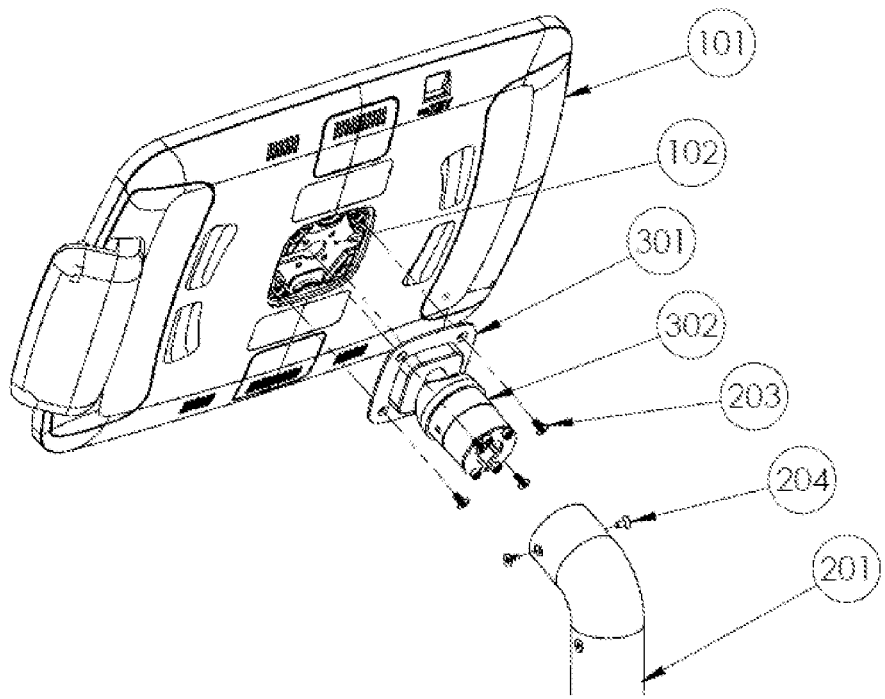
FIG. 4 shows the mounting system implemented with a pivoting mount.

FIG. 4 illustrates a configuration of the mounting system deployed in conjunction with a pivotable support 301. In this configuration, the mount plate 301 and pivotable support 302 are attached to the stiffener plate 102 with security screws 203 (for example, four security screws), similar to the rigid support illustrated in FIG. 2 and FIG. 3. The pivotable support 302 is secured to the support structure 201 with two additional security screws 204. Alternative means of attachment may be used instead of security screws 204, such as rivets or direct welding.

Figure 5:
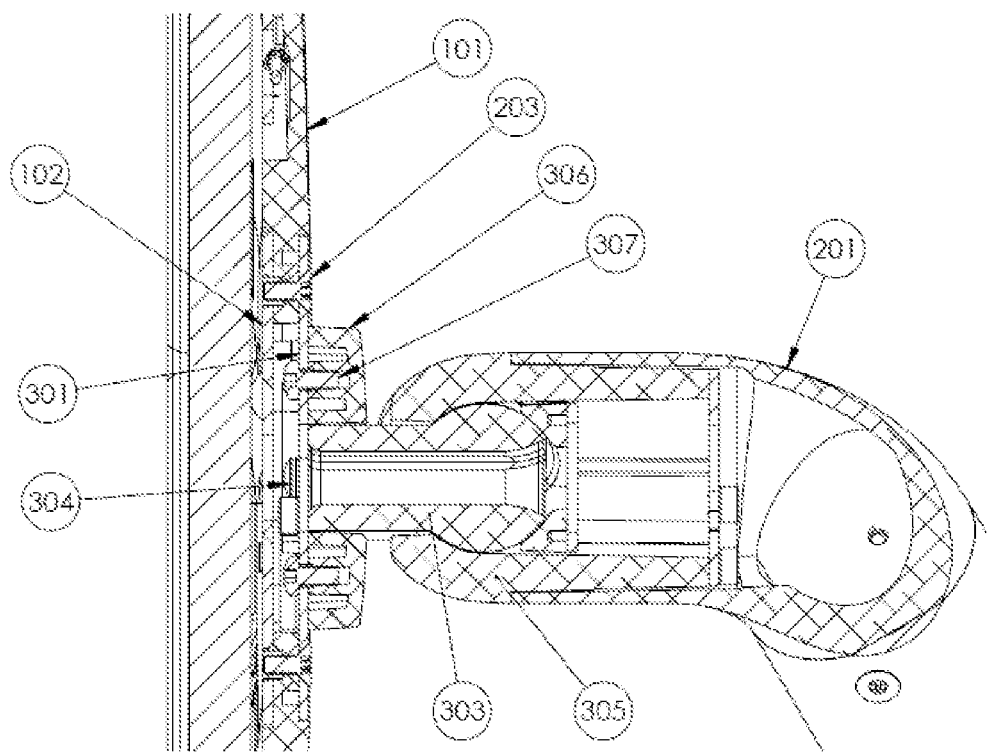
FIG. 5 shows a cross-section of the system implemented with a pivoting mount.

FIG. 5 illustrates a diagonal cross-section through the configuration illustrated in FIG. 4. Security screws 203 pass through the mount plate 301 and engage with threaded inserts in stiffener plate 102, sandwiching the enclosure housing 101. The mount plate 301 secures to the pivot arm 303 with screws 304, which is securely held within the pivot socket 305. A cosmetic cover 306 is held in place with screws 307. The pivot socket 305 is secured to the support structure 201 with security screws 204.

Figure 6:
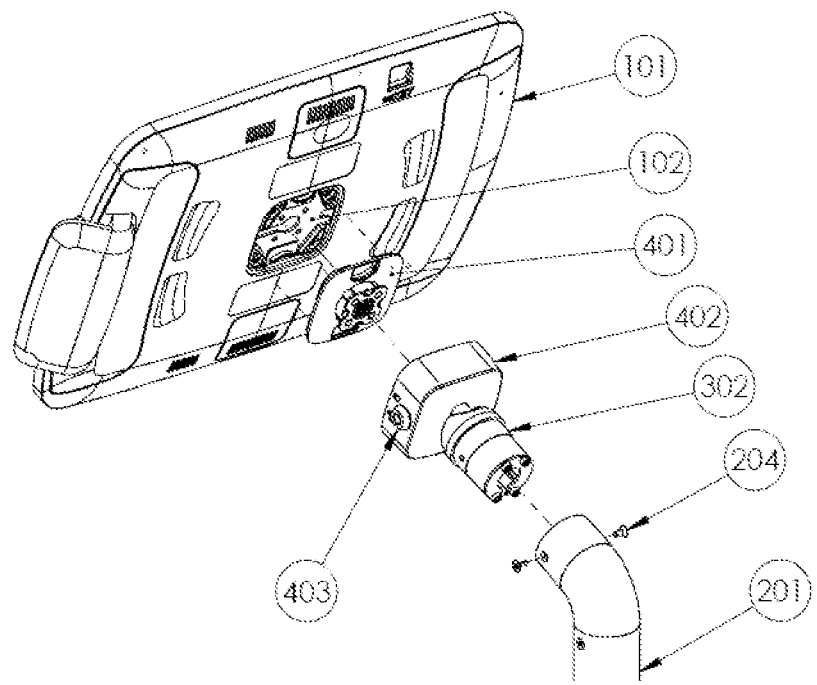
FIG. 6 shows the mounting system implemented with a removable and pivoting mount.

FIG. 6 illustrates a configuration of the mounting system deployed in conjunction with a separable interface panel 401 that facilitates removal of the enclosure from the support. The separable interface panel 401 secures to a dock mount apparatus 402 which incorporates a key lock 403. The dock mount apparatus 402 is in turn mounted to a pivot joint 302 similar to that illustrated in FIG. 4 and FIG. 5. The pivot joint 302 is secured to the support structure 201 with two additional security screws 204. Alternative means of attachment may be used instead of security screws 204, such as rivets or direct welding.

Figure 7:
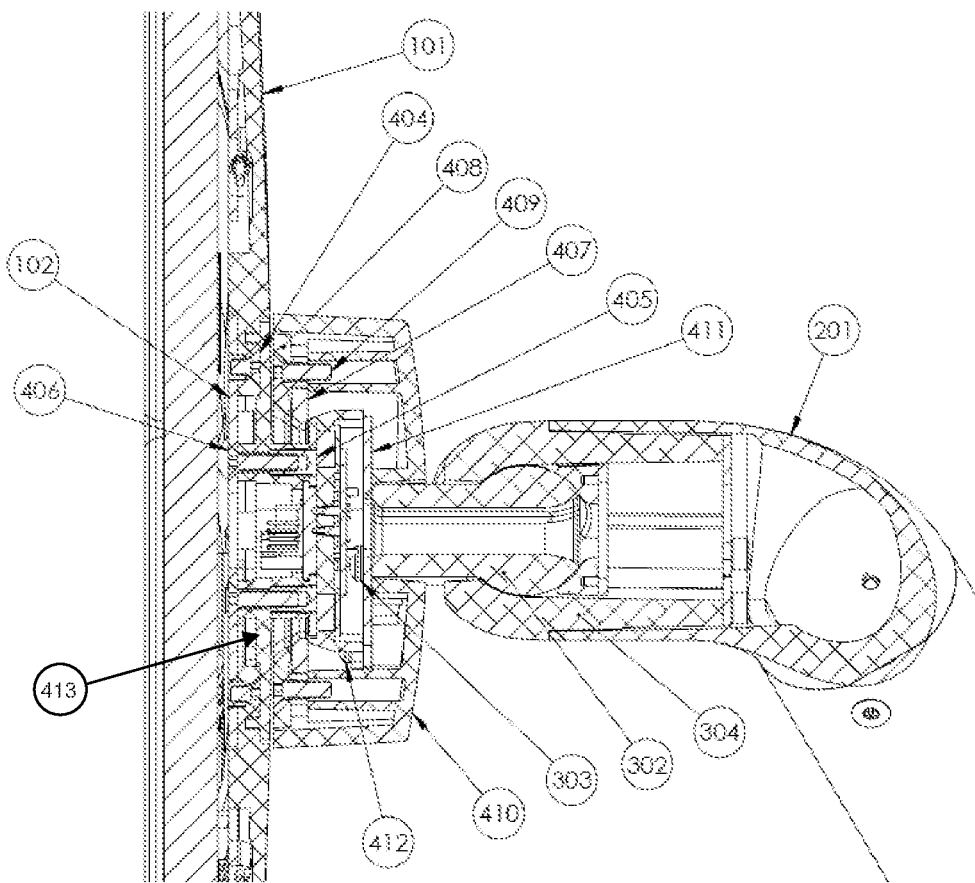
FIG. 7 shows a cross-section of the system implemented with a removable and pivoting mount.

FIG. 7 illustrates a diagonal cross-section through the configuration illustrated in FIG. 6. In this configuration, screws 404 pass through the enclosure housing 101 and engage with threaded inserts in stiffener plate 102. Additional screws 406 pass through the stiffener plate 102, through cosmetic panel 413, and into docking mount plate 405, pulling it tightly against the back of the enclosure. In this configuration, cosmetic panel 413 covers screws 404, making them inaccessible from outside the enclosure (the cosmetic panel 413 must be removed first, which requires removal of screws 406, which are only accessible from within the enclosure. In this configuration, screws 404 provide the clamping necessary to integrate the stiffness of the stiffener plate 102 into the enclosure housing 101. The cosmetic cover 413 allows those screws to be covered and made inaccessible. When the enclosure is mated to the dock mount apparatus 402 and the key lock 403 is put in the locked position, the lock plate 407 rotates and captures the docking mount plate 405. The lock plate 407 is contained within the dock mount apparatus 402 by screws 409 which hold the front dock housing 408 to the rear dock housing 410. An internal plate 411 is mounted within the rear dock housing 410 with screws 412. Screws 304 attach this internal plate 411 to the pivot arm 303 which is securely held within the pivot socket 305. The pivot socket 305 is secured to the support structure 201 with security screws 204.

Certain aspects of the subject matter described here can be implemented to use a stiffener plate as part of a system for mounting an enclosure for electronic devices, for example tablet computers, for the purpose of providing rigidity to the joint between a secure enclosure and its support structure. The stiffener plate can be used to provide a set of standard mounting points, allowing the enclosure to be configured with a variety of mounting apparatuses. Certain aspects of the subject matter described here can be implemented as a system of removable and interchangeable mounting components that attach to the stiffener panel for the purpose of mounting an enclosure for electronic devices to a support structure. The system can include a rigid support attached to the stiffener plate with screws that pass through and clamp the enclosure housing. A mount plate can be attached to the stiffener plate with screws that pass through and clamp the enclosure housing. The mount plate can, in turn, be supported by other hardware such as, for example, a pivoting mount and/or support structure.

A number of implementations have been described. Nevertheless, it will be understood that various modifications can be made without departing from the spirit and scope of the various inventions described herein.

What is claimed is:

1. A system comprising:
an enclosure housing to mount an electronic equipment, the enclosure housing having a portion configured to face towards the electronic equipment when mounted, wherein the portion comprises a forward surface configured to face towards the electronic equipment, a rear surface configured to face away from the electronic equipment and an opening extending from the forward surface to the rear surface;
a plurality of ribs formed within the enclosure housing;
a stiffener plate to be received by the plurality of ribs, the stiffener plate comprising a first surface and a second surface configured to face towards and away from the electronic equipment when mounted, respectively, the stiffener plate mounted on the portion of the enclosure housing configured to face towards the electronic equipment when mounted, wherein the stiffener plate is configured to be received on the forward surface, and wherein the stiffener plate is configured to receive a support member on the rear surface through the opening, the support member configured to support the enclosure housing; and a plurality of screws to hold the stiffener plate within the enclosure housing.

2. The system of claim 1, wherein the stiffener plate is made of at least one of steel, glass-filled nylon, fiberglass laminate, magnesium, or aluminum alloy.

3. The system of claim 1, wherein the plurality of screws comprises a first set of screws inserted into the stiffener plate from the portion configured to face towards the electronic equipment when mounted and a second set of screws inserted into the stiffener plate from an exterior of the enclosure housing configured to face away from the electronic equipment when mounted.

4. The system of claim 1, wherein the plurality of ribs form a pocket to receive the stiffener plate.

5. The system of claim 4, further comprising a plurality of radial ribs surrounding the pocket.

6. The system of claim 4, wherein the pocket is configured to receive one or more supports from outside the enclosure housing.

7. The system of claim 6, wherein the one or more supports include at least one of a rigid support or a pivotable support.

8. The system of claim 6, further comprising a rigid support mounted to the stiffener plate on one end of the rigid support and to a support structure on another end of the rigid support.

9. The system of claim 8, wherein the stiffener plate includes a plurality of threaded inserts to receive security screws that pass through the rigid support.

10. The system of claim 6, further comprising:
a pivotable support; and
a mount plate, wherein the pivotable support and the mount plate are attached to the stiffener plate.

11. The system of claim 10, wherein the stiffener plate includes a plurality of threaded inserts to receive security screws that pass through the mount plate and the pivotable support.

12. The system of claim 4, wherein the pocket is formed on the portion configured to face towards the electronic equipment when mounted.

13. The system of claim 1, further comprising:
a separatable interface panel;
a dock mount apparatus to which the separatable interface panel is attached;
a key lock incorporated in the dock mount apparatus; and
a pivot joint to which the dock mount apparatus is mounted.

14. The system of claim 1, wherein the plurality of ribs are formed on the portion configured to face towards the electronic equipment when mounted.

15. The system of claim 1, wherein the plurality of ribs are configured to extend towards the electronic equipment when mounted.

16. The system of claim 1, wherein the stiffener plate comprises a plurality of mounting points configured to attach the stiffener plate to a plurality of supporting mounts.

17. A system comprising:
an enclosure housing to mount an electronic equipment, the enclosure housing having a portion configured to face towards the electronic equipment when mounted;
a plurality of ribs formed within the enclosure housing on the portion configured to face towards the electronic equipment when mounted, wherein the plurality of ribs form a pocket, wherein the pocket is configured to receive one or more supports from outside the enclosure housing, wherein the one or more supports include at least one of a rigid support or a pivotable support;
a stiffener plate to be received by the pocket formed by the plurality of ribs on the portion configured to face towards the electronic equipment, the stiffener plate comprising a first surface and a second surface configured to face towards and away from the electronic equipment when mounted, respectively, the stiffener plate mounted on the portion of the enclosure housing configured to face towards the electronic equipment when mounted, wherein the second surface is configured to receive a plurality of screws to hold the stiffener plate within the enclosure housing; and
a rigid support mounted to the stiffener plate on one end of the rigid support and to a support structure on another end of the rigid support.

18. The system of claim 17, wherein the stiffener plate includes a plurality of threaded inserts to receive security screws that pass through the rigid support.

19. The system of claim 17, further comprising:
a pivotable support; and
a mount plate, wherein the pivotable support and the mount plate are attached to the stiffener plate.

20. The system of claim 19, wherein the stiffener plate includes a plurality of threaded inserts to receive security screws that pass through the mount plate and the pivotable support.

* * * * *